April 12, 1966  A. D. WALL  3,245,276
MOTION AND POWER-TRANSMITTING BELTS
Filed March 31, 1964  2 Sheets-Sheet 2
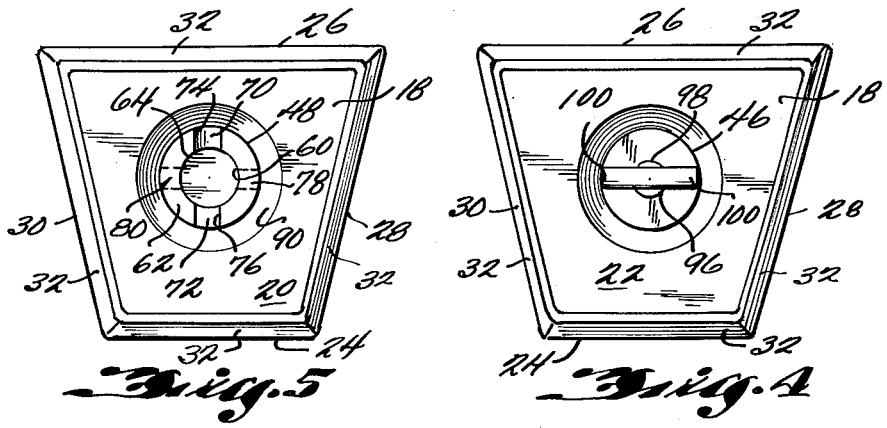
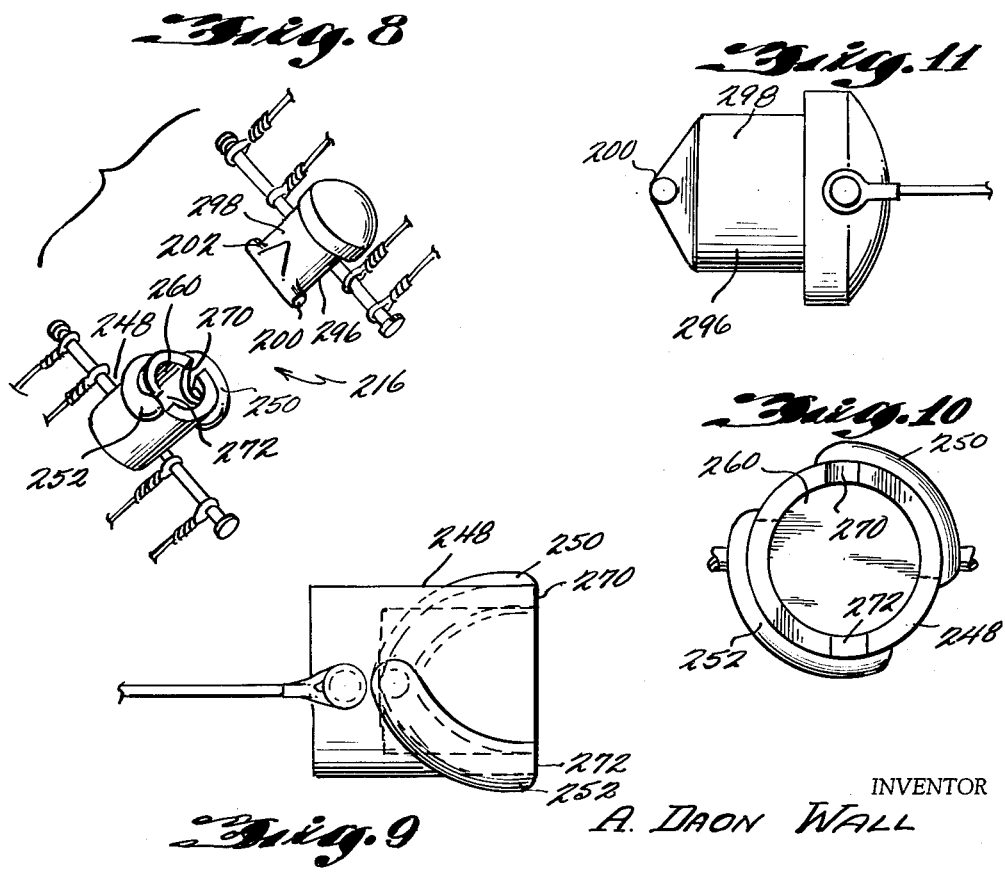
INVENTOR
A. DAON WALL
BY Cushman, Darby & Cushman
ATTORNEYS

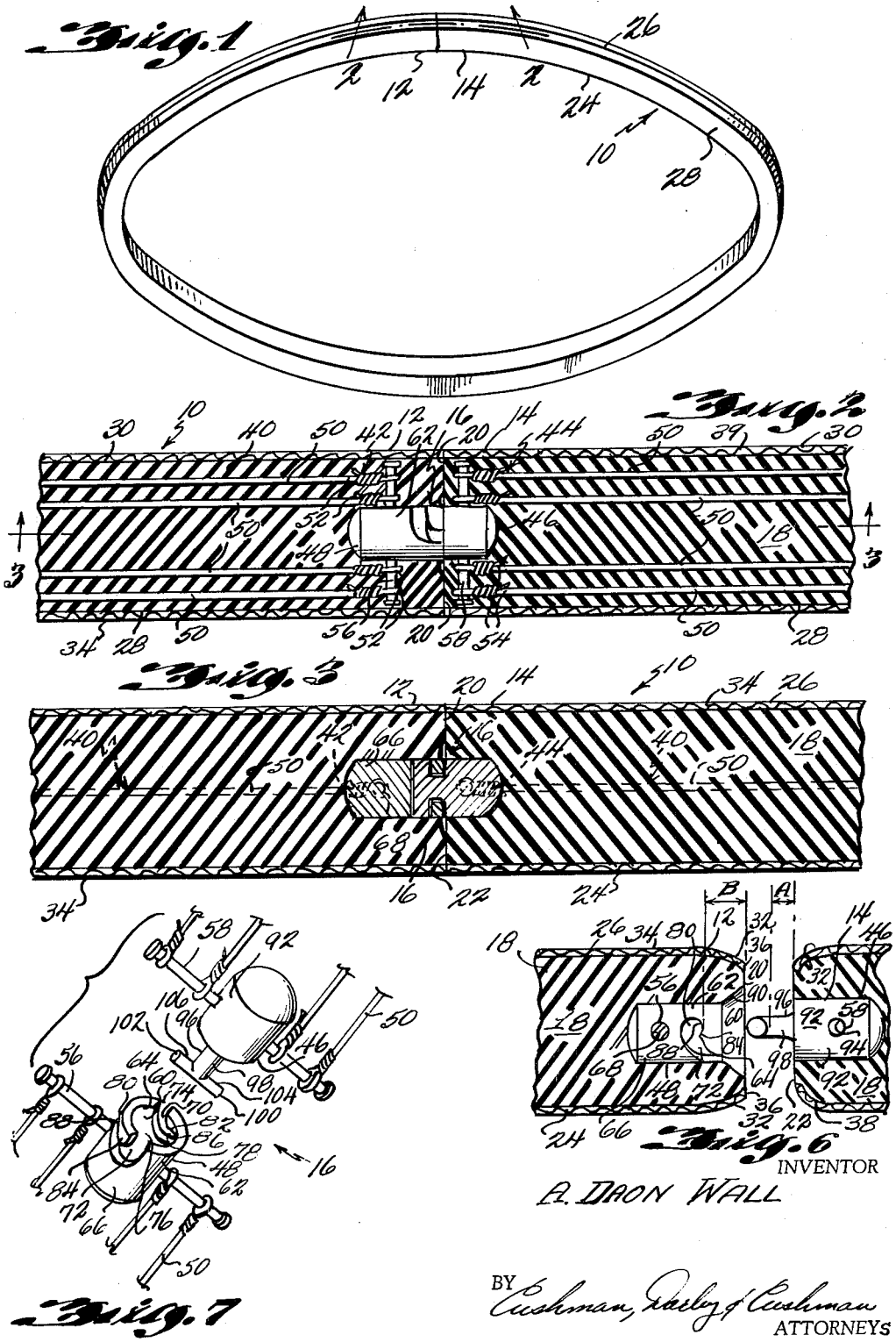

United States Patent Office 3,245,276
Patented Apr. 12, 1966

3,245,276
MOTION AND POWER-TRANSMITTING BELTS
Abner Daon Wall, 905 W. Hanna St., Denison, Tex.
Filed Mar. 31, 1964, Ser. No. 356,108
12 Claims. (Cl. 74—234)

The present invention relates generally to motion and power transmitting belts and, more particularly, to novel detachable connector means for joining the opposite ends of a length of V-belting to form the same into an endless belt.

The use of either single or multiple strands of so-called open end V-belting, wherein the opposed ends of the V-belt are provided with separable or detachable connectors for joining the ends to form an endless belt, now make it possible for belt drives to be established and maintained in many types of machinery without the necessity of dismantling or materially disturbing the machinery installation. In addition, the advent of such fasteners making practicable the use of open end V-belting, has made it possible to employ V-belt drives in many instances where, previously, the installation of endless V-belts would be impossible. Despite the aforementioned advantages, such prior art detachable V-belt connectors were deficient in several respects. For example, such prior art efforts frequently resulted in V-belt connectors having an excessive number of parts which were not only difficult to assemble and disassemble, but also, because of the necessarily relatively small size of such parts, were easily lost during assembly and/or disassembly operations. Similarly, past efforts have frequently failed to provide for the required relative movement between the belt and connector to the degree necessary for proper travel of the connectors around the pulleys or sheaves. In addition, as is obviously undesirable, such prior art connectors themselves were not only often unable to withstand the relatively large tension stresses encountered in high speed belt drives, but also did not retain the load stresses centered on the belt axis during travel of the connectors around the peripheries of the pulleys.

Thus, premature failure of V-belt drives employing such prior art connector constructions was not uncommon, since either the connector itself frequently failed, or the belt would fail as a result of the load in the longitudinal revolving plane being carried by the body and casing of the belt rather than the metal core. Another disadvantage frequently encountered in prior art connectors was the obviously highly undesirable unintentional unfastening of the connector from the body portion of the belt. Moreover, with many prior art connector constructions, slip and noise resulting from connector contact with the pulleys or sheaves has been a source of considerable dissatisfaction In addition, prior art V-belt connectors were often riveted to the belt at more or less localized areas close to the ends of the belt. Thus, in instances where such V-belts were subjected to considerable tension, the riveted connections were frequently pulled off the belt ends by failure of the belt material itself to withstand such tension without tearing.

Accordingly, a principal object of the present invention is to provide an improved motion and power-transmitting belt.

Another object of the present invention is to provide an improved end connection construction for an open end motion and power-transmitting belt.

A further object of the present invention is to provide an improved means for joining the opposite ends of a length of V-belting to form the same into an endless belt.

Another object of the present invention is to provide an improved V-belt connector means of simple construction which is easily assembled and disassembled.

Still another object of the present invention relates to an improved V-belt connector providing a positive and secure tensioned connection which effectively resists unintentional disconnection.

A further object of the present invention is to provide an improved V-belt connector wherein the connector elements are prevented from contacting the pulley or sheaves when the opposed ends of the belt are joined to thereby eliminate slip and noise.

A still further object of the present invention is to provide an improved V-belt connector wherein the resultant load stresses are maintained centered on the belt axis.

A still further object of the present invention is to provide an improved V-belt connector wherein the tension load in the longitudinal revolving plane is carried by the metal belt core rather than the belt body and casing.

Other objects and the entire scope of the present invention will become apparent from the following detailed description and by reference to the accompanying drawings. It should be understood, however, that the detailed description and specific examples, while indicating preferred embodiments of the invention, are given by way of illustration only, since various changes and modifications within the spirit and scope of the invention will become apparent as the description herein progresses. Reference now being made to the accompanying drawings which form a part hereof, wherein:

FIGURE 1 is a perspective view of an open end V-belt embodying this invention with the opposed ends of the belt separably joined together to form an endless belt;

FIGURE 2 is a fragmentary sectional plan view of the connected opposed V-belt ends taken along the line 2—2 of FIGURE 1;

FIGURE 3 is a fragmentary sectional side view of the connected opposed V-belt ends taken along the line 3—3 of FIGURE 2;

FIGURE 4 is an end elevational view of the end of the V-belt shown in FIGURE 1 carrying the male connector element;

FIGURE 5 is an end elevational view of the other end of the V-belt shown in FIGURE 1 carrying the female connector element;

FIGURE 6 is a fragmentary side view, in section, of the opposed V-belt ends in disconnected condition;

FIGURE 7 is a fragmentary perspective view of the connector means and metallic core means of the present invention carried by the V-belt shown in FIGURES 1–6;

FIGURE 8 is a fragmentary perspective view of the connector means and metallic core means of a modified form of the present invention;

FIGURE 9 is a side elevational view of the female connector element of the modification illustrated in FIGURE 8;

FIGURE 10 is an end elevational view of the female connector element illustrated in FIGURE 9; and FIGURE 11 is a side elevational view of the male connector element of the modification illustrated in FIGURE 8.

Referring now to FIGURES 1, 2 and 3 of the drawings, there is shown an open end V-belt 10 having opposed end portions 12 and 14 separably joined together by connector means 16 to form an endless belt according to the present invention.

The V-belt 10 includes an elongated flexible body 18, formed of rubber or other suitable resilient material, terminating in substantially flat or planar opposed end faces 20 and 22. As best seen in FIGURES 1, 4 and 5, the flexible body 18, which is preferably formed by molding, is of truncated V-shaped cross section having opposed longitudinally extending substantially parallel surfaces defining inner and outer faces 24 and 26, respectively, when the opposed end portions 12 and 14 of the belt are joined to form an endless belt, and converging side faces 28 and 30 adapted to conform to the converging sidewalls of conventional sheaves or V-pulleys (not shown) about which the V-belt 10 may be trained.

With the exception of the portions immediately adjacent the end faces 20 and 22, the truncated V-shaped cross section of the belt body 18 is of substantially uniform size throughout its longitudinal extent. Immediately adjacent the opposed end faces 20 and 22 of the belt body 18, the inner, outer and side faces 24, 26, 28 and 30, respectively, thereof are provided with chamfered or beveled portions 32 in order to progressively reduce the cross sectional size of the belt body toward the end faces, for reasons to be more fully described hereinafter.

Preferably, the V-belt 10 includes a suitable exterior covering 34 formed of woven cord or other suitable fabric-like material which snugly envelops, and conforms to the exterior surface of, the flexible belt body 18 throughout its length. In order to prevent premature fraying and consequent separation of the covering 34 during operation of the V-belt 10, the opposed end portions 36 and 38 of the covering preferably extend over a portion of the end faces 20 and 22, respectively, of the belt body 18 and are suitably secured or adhered thereto such as by being at least partially embedded in the respective underlying rubber end face, as best seen in FIGURE 6.

Embedded within the belt body 18, preferably during the formation or molding thereof, is a longitudinally extending flexible reinforcing metallic core means 40 terminating inwardly of the end faces 20 and 22 in opposed end portions 42 and 44, respectively, which pivotally carry the mating male and female connector elements 46 and 48, respectively, of the connector means 16. In the illustrated embodiments of the invention the metallic core means 40 will be seen to comprise a plurality of laterally spaced longitudinally extending steel cables 50 lying in a common transversely extending plane substantially parallel to the intermediate inner and outer faces 24 and 26. The steel cables 50 terminate in opposed end portions 52 and 54 which are rigidly connected to transversely extending pivot pin means 56 and 58, respectively, also embedded within the belt body 18. The flexible belt body 18 will be seen to maintain the longitudinally extending steel cables 50 throughout their length in the desired laterally spaced relationship. Preferably, the connector elements 46 and 48 as well as the pivot pin means 56 and 58, are formed of case hardened steel.

The male connector element 46 and the mating female connector element 48 are pivotally carried intermediate the ends of the transversely extending pivot pin means 56 and 58, respectively, so as to be transversely centered between the converging side faces 28 and 30 of the belt body 18.

As best seen in FIGURES 5, 6 and 7, the female connector element 48, which is embedded within the belt body 18, includes a cylindrical male connector receiving and retaining socket 60 defined by a substantially cylindrical sidewall 62, extending longitudinally of the belt body 18 and terminating at one end in a circular aperture or mouth 64 inwardly of the end face 20 of the belt body. The other end of the socket 60 adjacent the end portions 52 of the cables 50, is preferably closed by a transversely extending axially thickened pivot pin receiving base portion 66. The base portion 66 is provided with a transversely extending cylindrical bore 68 which rotatably receives the transversely extending pivot pin means 56 to thereby pivotally connect the female connector element 48 to the steel cables 50.

The cylindrical sidewall 62 is provided with a pair of diametrically opposed arcuate pin receiving slots 70 and 72 which extend from their respective open origins or mouth portions 74 and 76, at the mouth 64 of the socket 60, axially and circumferentially of the cylindrical sidewall 62 so as to terminate in diametrically opposed pin retaining recesses 78 and 80, respectively. It should be noted, that while in the preferred embodiment which is illustrated, the slots 70 and 72 are shown to be diametrically opposed and to have an arcuate or helical configuration, it will be apparent that the desired axial and angular circumferential displacement of the pin retaining recesses 78 and 80 from the origins 74 and 76 of their respective slots 70 and 72 can be effected with other slot configurations and dispositions. In order for the female connector element 48 to operatively cooperate with the male connector element 46, as will be more fully described hereinafter, it is necessary that the pin retaining recesses 78 and 80 in which each slot terminates be disposed equally, both, axially inwardly and angularly in the same circumferential direction, relative to their respective origins or mouth portions 74 and 76.

Each of the pin retaining recesses 78 and 80 will be seen to be formed by an extension or enlargement of the terminus of their respective slots 70 and 72, extending axially toward the mouth 64 of the socket 60 so as to provide axially protruding abutment shoulders 82 and 84, respectively and circumferentially extending pin means restraining surfaces 86 and 88, respectively.

In order to permit communication of the male connector element 46 with the female connector element 48 when the mouth 64 of the socket is disposed inwardly of the end face 20 of the belt body 18, as illustrated, the end face 20 is relieved so as to provide a counterbore or countersunk portion 90 extending longitudinally inwardly of the belt body from the end face 20 in axial alignment with the socket 60.

The male connector element 46 includes an enlarged, preferably cylindrical base portion 92, embedded within the belt body 18, having a transversely extending cylindrical bore 94 which rotatably receives the transversely extending pivot pin means 58 to thereby pivotally connect the male connector element 48 to the steel cables 50. Extending axially from the cylindrical base portion 92, so as to protrude beyond the end of face 22 of the belt body 18, is a T-shaped bit 96 comprising a reduced diameter axially extending cylindrical stem 98 terminating in a pair of diametrically opposed radially extending retaining pin means 100 and 102 adopted to be operatively received within the slots 70 and 72 respectively, of the female connector element 48 so as to be retained in connecting engagement in the diametrically opposed pin retaining recesses 78 and 80 respectively. Of course the transverse or radial extent of the retaining pin means 100 and 102, must be sufficient to permit operative engagement thereof with the circumferentially extending restraining surfaces 86 and 88 of the pin retaining recesses 78 and 80 of the female connector element 48. In addition, in order that the connection between the end portions 12 and 14 of the belt 10 once operatively established, be maintained under tension, the axial or longitudinal distance A between the end face 22 of the belt 10 and the opposed facing surface portions 104 and 106 of the retaining pin means 100 and 102, respectively, must be less than the axial or longitudinal distance B between the retaining surfaces 86 and 88 of the pin retaining recesses 78 and 80, respectively, and the other end face 20 of the belt 10. Moreover, it should be noted, that the relative arrangement of the male connector element 46 with respect to the female connector element 48 must be such that when the end portions 12 and 14 of the belt 10 are operatively aligned so that the adjacent inner, outer and side faces 24, 26, 28 and 30 respectively, are longitudinally aligned, the pin means 100 and 102 of the male connector element 46 will be in axial alignment with the pin retaining recesses 78 and 80 of the female connector element 48.

In establishing the connection between the opposed end portions 12 and 14 of the open end V-belt 10 to form the same into an endless belt, after juxtapositioning the end portions 12 and 14 so as to axially align the male and female connector elements 46 and 48 respectively, carried thereby, the retaining pin means 100 and 102 are aligned with the mouth portions 74 and 76 of the slots 70 and 72 by effecting relative rotation or relative angular displacement about the longitudinal axis of the belt of one end portion of the belt relative to the opposed end portion thereof. Thus with the opposed end portions 12 and 14 of the V-belt 10 disposed as illustrated in FIGURE 6, the end portion 12, for example, can be held stationary while the opposed end portion 14 is twisted or turned on its longitudinal axis 90° to dispose the retaining pin means 100 and 102 in entering alignment with the mouth portions 74 and 76 of the slots 70 and 72. With the retaining pins 100 and 102 thus aligned with the mouth portions 74 and 76, relative axial movement of the end portions 12 and 14 toward one another will result in the T-shaped bit 96 being inserted axially into the socket 60 so as to dispose the retaining pin means 100 and 102 within the slots 70 and 72 respectively and effect abutment of the opposed end faces 20 and 22 of the V-belt 10. Continued axial movement of the end portions 12 and 14 of the belt toward one another with the end faces 20 and 22 abutting and relative angular movement of the end portions about their longitudinal axis so as to return them to their operative aligned positions will result in the seating of the retaining pin means 100 and 102 within the retaining recesses 78 and 80 of the slots 70 and 72. By virtue of the aforedescribed construction wherein, in the relaxed or disconnected condition of the V-belt 10, the distance A between the end face 22 and the opposed facing surfaces 104 and 106 of the pin means 100 and 102 is less than the distance B between the end face 20 and the circumferentially extending restraining surfaces 86 and 88, operative seating of the retaining pin means 100 and 102 in the retaining recesses 78 and 80 will necessitate compression of the resilient material of the belt body 18 adjacent the end portions 12 and 14 thereof. After seating of the retaining pin means 100 and 102 in the retaining recesses 78 and 80, the resilient belt body material will remain under compression and therefore resiliently urge the retaining pin means 100 and 102 into engagement with the restraining surfaces 86 and 88 to thereby maintain the connection of the belt ends under tension. Obviously, engagement of the retaining pin means 100 and 102 with the restraining surfaces 86 and 88, prevents relative axial sparation of the opposed end portions 12 and 14 of the V-belt 10. The aforedescribed axial compression of the resilient belt body material maintaining the connection of opposed end portions 12 and 14 under tension, will result in radially outward expansion and consequent increased cross-sectional size of the belt body 18 immediately adjacent the abutting end faces 20 and 22. Such increased cross-sectional size is compensated for by the reduced cross-sectional size of the belt body 18, in the relaxed condition, immediately adjacent the end faces 20 and 22 formed by the chamfered or beveled portions 32, so that the endless V-belt thus formed presents a substantially continuous smooth plain surface to the sheaves or V-pulley means about which it may be trained.

By virtue of the axially protruding abutment shoulders 82 and 84 formed in the pin retaining recesses 78 and 80 disconnection of the joined belt ends 12 and 14 requires that the belt ends 12 and 14 be initially urged axially toward one another to overcome the retaining tension exerted by the resilient belt body material, so as to permit the retaining pin means 100 and 102 to clear the abutment shoulders 82 and 84, thus permitting the required relative angular and axial disconnecting movement of the belt ends 12 and 14. It will thus be apparent that the axially protruding abutment shoulders 82 and 84 provide a simple yet effective means for effectively resisting unintentional disengagement of the connector elements 46 and 48 once the end portions 12 and 14 of the belt have been operatively joined to form an endless V-belt. Moreover, by virtue of the pivotal connection of the male and female connector elements 46 and 48, to the cables 50, the necessary relative hinging motion between the opposed belt ends 12 and 14 in the plane of rotation transmitting movement of the V-belt when passing over sheaves or V-pulleys about which the belt is trained is permitted.

It will, of course, be apparent to those skilled in the art that other dispositions of the male and female connector elements 46 and 48 relative to the end portions 12 and 14 of the V-belt 10 may be made which will produce the desired tensioned belt end connection. Thus, it is only necessary that in the unconnected condition with the end faces 20 and 22 abutting, the relaxed or uncompressed axial thickness of the resilient belt body material intermediate the cooperating interengageable retaining surfaces of the male and female connector elements be sufficient to maintain such interengageable retaining surfaces axially spaced from one another so that interengagement thereof requires axial compression of such intermediate resilient belt material.

Referring now to FIGURES 8, 9, 10 and 11 of the drawings, there is shown a modified form of connector means 216 embodying the invention. The construction of the connector means 216 differs from that of the connector means 16, just described, in that the retaining pin receiving slots 270 and 272 of the female connector element 248 are provided with integral exterior covering portions 250 and 252, respectively, which serve to strengthen the female connector element 248. In addition, the stem portion 298 of the T-shaped bit 296 which carries at its terminal end the connector pins 200 and 202, is of enlarged diameter so as to more closely fit the interior diameter of the socket 260 of the female connector element 248. The connection effected by connector element 216 will, as was the case with the embodiment of the invention described by reference to FIGURES 1–7, be maintained under tension due to compression of the resilient material adjacent the end portions of the V-belt to thereby effectively resist unintentional disengagement of the operatively joined belt ends.

While in the foregoing embodiments of the invention a V-belt having a truncated V-shaped cross section has been described, it will be apparent that open end belts of other cross sections may be employed, such as for example, power and motion transmitting belts having rectangular or rounded cross sections.

It will thus be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

I claim:

1. A belt having opposed ends adapted to be separably connected to form an endless belt comprising in combination: a belt body formed of flexible resilient material having a flexible core means embedded longitudinally therein; a first connector means embedded in one terminal end portion of said resilient belt body and connected to said flexible core means; and a second connector means embedded in the other terminal end portion of said resilient belt body and connected to said flexible core means; said first and second connector means being interengageable to operatively connect said opposed ends of said belt under forces tending to effect relative axial movement of said first and second connector means away from one another and disengageable only after the exertion of forces tending to effect relative axial movement of said first and second connecter means toward one another, and said first and second connector means being disposed axially of the end faces of said terminal end portions of said belt body such that when the end faces of said terminal end portions are abutted without axial compression of the resilient belt body material adjacent said first and second connector means the interengageable portions of said first and second connectors means are spaced axially from one another so that belt end connecting interengagement of said first and second connector means requires abutment of the end faces of said terminal end portions and axial compression of the resilient belt body material adjacent said first and second connector means so that forces tending to effect relative axial movement of said first and second connector means away from one another will be imparted thereto whereby unintentional disengagement of said interengaged first and second connector means and resulting disconnection of said opposed belt ends will be resisted.

2. The structure defined in claim 1 wherein the first connector means includes a cylindrical socket extending longitudinally of the belt having retaining surface means extending transversely of said belt; and said second connector means includes transversely extending pin means receivable within said cylindrical socket so as to interengage said retaining surface means.

3. The structure defined in claim 2 wherein the terminal end portions of said belt body terminate in substantially planar end faces and the axial distance between the retaining surface means and the adjacent end face of its terminal end portion is greater than the axial distance between the interengaging surface of the transversely extending pin means and the adjacent end face of its terminal end portion.

4. The structure defined in claim 3 wherein the cross-sectional size in the uncompressed condition of the portion of the belt body which is under axial compression when the opposed ends of the belt are connected is smaller than that of the belt body intermediate said portions whereby the endless belt formed by connection of the ends will be of substantially uniform cross-sectional size.

5. The structure defined in claim 3 wherein the belt is an open end V-belt and the belt body is rubber and the flexible core means is formed of metal.

6. The structure defined in claim 4 wherein the flexible core means comprises a plurality of laterally spaced metal cables.

7. The structure defined in claim 5 wherein the first and second connector means are pivotally connected to the opposed ends of the metal cables by means of transversely extending pivot pin means.

8. The structure defined in claim 6 wherein the belt includes an exterior covering of woven cord material.

9. A belt having opposed ends adapted to be separably connected to form an endless belt comprising in combination: an elongated belt body formed of flexible resilient material, said belt body having end portions terminating in opposed end faces; a flexible metallic core means embedded longitudinally within said belt body and terminating inwardly of said end faces; a female connector means embedded within one end portion of said resilient belt body and connected to one end of said flexible core means, said female connector means including a socket extending longitudinally of said belt body toward the end face of said one end portion and terminating in a mouth portion inwardly of, but in communication with, the end face of said one end portion, said socket including retaining surface means disposed axially inwardly of said mouth portion and extending transversely of said belt body; and a male connector means embedded within the other end portion of said resilient belt body and connected to the other end of said flexible core means, said male connector means including transversely extending pin means disposed outwardly of the end face of said other end portion, said transversely extending pin means being receivable by said socket so as to engage said retaining surface means to thereby operatively connect said opposed ends of said belt, and the axial distance between said retaining surface means and the end face of said one end portion of said resilient belt being greater than the axial distance between the retaining means engaging surface of said pin means and the end face of said other end portion of said resilient belt so that connection of said opposed belt ends by engagement of said pin means with said retaining surface means effects axial compression of the resilient belt body material adjacent said male and female connector means whereby said pin means and said retaining surface means are urged into firm engagement and unintentional disconnection of said opposed belt ends is resisted.

10. The structure defined in claim 9 wherein the socket includes an axially extending abutment means adjacent the retaining surface means adapted to engage the pin means to prevent unintentional disengagement of the male and female connector means.

11. The structure defined in claim 9 wherein the cross-sectional size in the uncompressed condition of the portion of the belt body which is under axial compression when the opposed ends of the belt are connected is smaller than that of the belt body intermediate said portions whereby the endless belt formed by connection of the ends will be of substantially uniform cross-sectional size.

12. The structure defined in claim 11 wherein the belt is an open end V-belt and the belt body is rubber and the flexible core means is formed of metal.

References Cited by the Examiner

UNITED STATES PATENTS

| 279,267 | 6/1883 | Nock | 24—221 X |
|---|---|---|---|
| 805,359 | 11/1905 | Greist. | |
| 1,199,690 | 9/1916 | Gillan | 24—221 |
| 1,342,671 | 6/1920 | Fesler. | |
| 2,038,469 | 4/1936 | Bannister | 74—238 X |
| 2,723,876 | 11/1955 | Langlois | 24—221 X |

FOREIGN PATENTS 712,116  7/1954  Great Britain.

DAVID J. WILLIAMOWSKY, *Primary Examiner.*

DON A. WAITE, *Examiner.*

J. A. WONG, *Assistant Examiner.*